No. 619,668. Patented Feb. 14, 1899.
S. O. CAMPBELL.
GATE LATCH.
(Application filed Aug. 23, 1898.)
(No Model.)
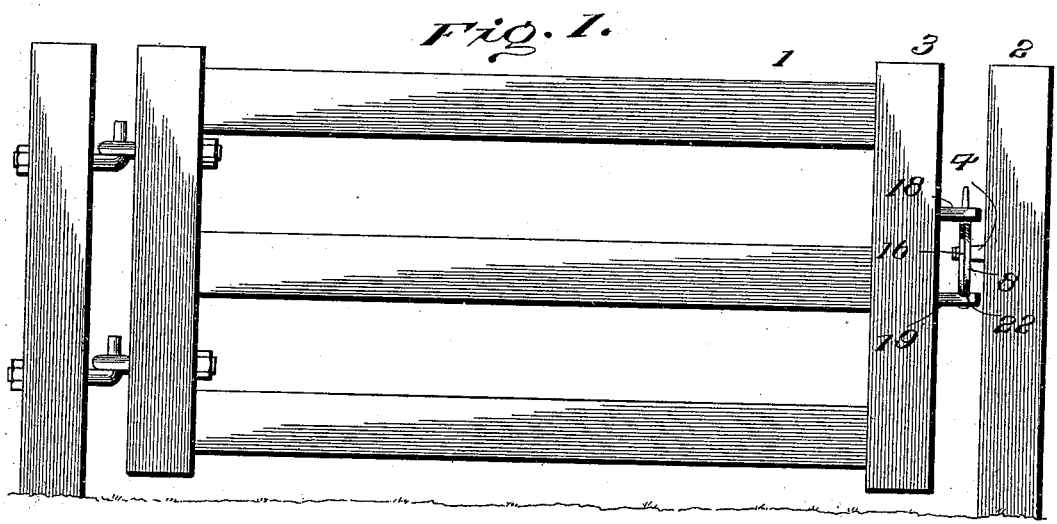
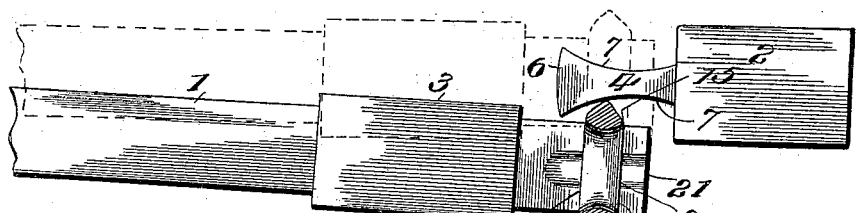
Witnesses
Inventor
Solon O. Campbell
by R. S. & A. B. Lacey,
Attorneys

UNITED STATES PATENT OFFICE.

SOLON OWEN CAMPBELL, OF EAST PERU, IOWA.

GATE-LATCH.

SPECIFICATION forming part of Letters Patent No. 619,668, dated February 14, 1899.

Application filed August 23, 1898. Serial No. 689,326. (No model.)

*To all whom it may concern:*

Be it known that I, SOLON OWEN CAMPBELL, a citizen of the United States, residing at East Peru, in the county of Madison and State of Iowa, have invented certain new and useful Improvements in Gate-Latches; and I do hereby declare the following to be a full, clear, and exact description of the invention, such as will enable others skilled in the art to which it appertains to make and use the same.

This invention relates to gate-latches, and more particularly to that class carrying a latch which will automatically engage a striker on a contiguous stationary post and secure the gate closed against accidental opening.

The present invention, generally stated, consists of improvements on the device disclosed in Patent No. 582,039, granted to me May 4, 1897.

The invention further consists of the details of construction and arrangement of the several parts, which will be hereinafter more fully described and claimed.

The object of the invention is to overcome the deficiencies and irregularities found to exist in the device described by the said patent and produce a more positive and satisfactory operating-latch of the same character.

In the accompanying drawings, Figure 1 is an elevation of a gate and post having the parts of the improved latch applied thereto. Fig. 2 is a top plan view of a part of the gate and latch post, showing the gate as closing and the latch in section. Fig. 3 is a detail perspective view of the improved latch. Fig. 4 is a similar view of the striker. Fig. 5 is a detail view of a modified form of the striker.

Referring to the drawings, wherein similar numerals are utilized to indicate corresponding parts in the several views, the numeral 1 designates an ordinary horizontal swinging gate, and 2 a fixed post contiguous to the stile 3 on the free end of the gate. At a suitable elevation a horizontal keeper 4 is rigidly secured in the post 2, its projecting shank being flat and gradually widening or diverging from a shoulder 5 to an outer convex edge 6. The opposite side edges 7 of the shank are concave, and the metal is thicker adjacent the shoulder 5 than at the said convex edge. A latch-link 8 is employed in this instance also and has a depending stud 9 at the lower end and an upper vertical stud 10, which terminates in a curved tapered finger-grip 11. This link is preferably rectangular in form and approximates an ellipse, with the exception that its semicircular ends 12 and 13 are connected by parallel side bars 14 and 15. The outer surfaces of the side bars are formed with double bevels, meeting at the center in projecting edges 16, which gradually merge into the rounded outer surfaces 17 of the circular ends 12 and 13.

A horizontal upper bracket 18 is fixed in the outer edges of the stile 3 and is formed with a vertical orifice which encompasses and forms a bearing for the stud 10 on the upper end of the link. A second bracket 19 is mounted in the stile 3 below the bracket 18 and in a vertical plane with the latter, said bracket also having a vertical orifice to rotatably receive the stud 9 on the lower end of the link. The said brackets movably confine the link between them in a vertical position, and the upper face of the lower bracket 19 is formed with intersecting grooves 21 and 22 to provide seats for receiving the lower rounded end of the link to prevent too loose operation and hold said link with more certainty in either an open or locking position and facilitate the operations sought. The rounded edges of said grooves and the rounded engaging end of the link will prevent also such resistance to a quick action as is necessary to the automatic movement of the link in locking the gate closed or the easy release of said link when opening the gate, and at the point where said grooves cross a socket is formed, which materially aids in holding the link, as stated.

The latch will of course work from either side, and when it is desired to open the gate the link is moved to clear the keeper and the lower end 13 becomes positioned in the longitudinal groove 21 and is held thus until either one of the bars 14 or 15 strikes either concave edge of said striker. When the gate is closed, the nearest bar to the striker engages the adjacent concave edge of the latter and the projecting edge of the said bar gradually rides thereover, and at the same time the link is turned thereby and until the opposite side thereof is thrown over the convex end of the striker and the lower end 13 is seated in the transverse groove 22 in the bracket 19. The convex edge 6 of the striker assists the movement of the link over the end of the striker, and the widened end of said striker, together with the transverse groove in the bracket 19, prevents accidental disengagement of the link by blows or pressure brought to bear on the gate. The outer reduced part of the engaging end or shank of the striker also assists in the connection therewith or disconnection therefrom of the link without in the least weakening the structure. The widened outer end of the shank of the striker also prevents the link from flying away from the edge of said striker with which it first engages, and after the opposite part of said link passes over the other edge of said striker and which might occur if a straight shank was employed and the gate closes with considerable force.

In Fig. 5 a modified form of the striker is shown and is intended to obviate clutching garments of persons passing close to it or of injuring stock. The shank 23 in this instance is of about equal diameter throughout and has an outer flanged head 24 with a rounded or convex exposed surface 25, and on directly opposite sides of the shank, near and merging into the head at said points, are curved guiding-surfaces 26, against which the latch-link 8 strikes.

The parts of the device are subject to such changes in proportions, dimensions, and details of construction as lie within the scope of the invention.

Having thus described the invention, what is claimed as new is—

1. The combination with a free gate end, of upper and lower brackets thereon, a latch-link vertically and pivotally disposed between said brackets, the lower bracket having intersecting grooves in the upper surface thereof and the link formed with upper and lower rounded ends and opposite sides formed with double bevels to provide centrally-located exteriorly-projecting edges, and a fixed post having a striker thereon.

2. A gate-latch comprising a vertically-disposed freely-movable link-latch having the opposite sides formed with double bevels terminating at central projecting edges, means for supporting said link, and a striker having a flattened diverging shank with opposite concave edges and an outer convex end.

3. A gate-latch comprising upper and lower horizontally-disposed brackets, the upper surface of the lower bracket having intersecting grooves therein, a vertically-disposed latch-link pivotally confined between said brackets and having upper and lower rounded ends and opposite side bars provided with exterior double bevels terminating in central projecting edges, and a striker having a flattened shank diverging to an outer convex end and provided with opposite concave edges.

In testimony whereof I affix my signature in presence of two witnesses.

SOLON OWEN CAMPBELL.

Witnesses:
RICHARD S. HORTON,
L. PETTENGILL.